J. B. LADD.
CENTRIFUGAL PIPE CASTING.
APPLICATION FILED NOV. 1, 1918.
1,351,766. Patented Sept. 7, 1920.
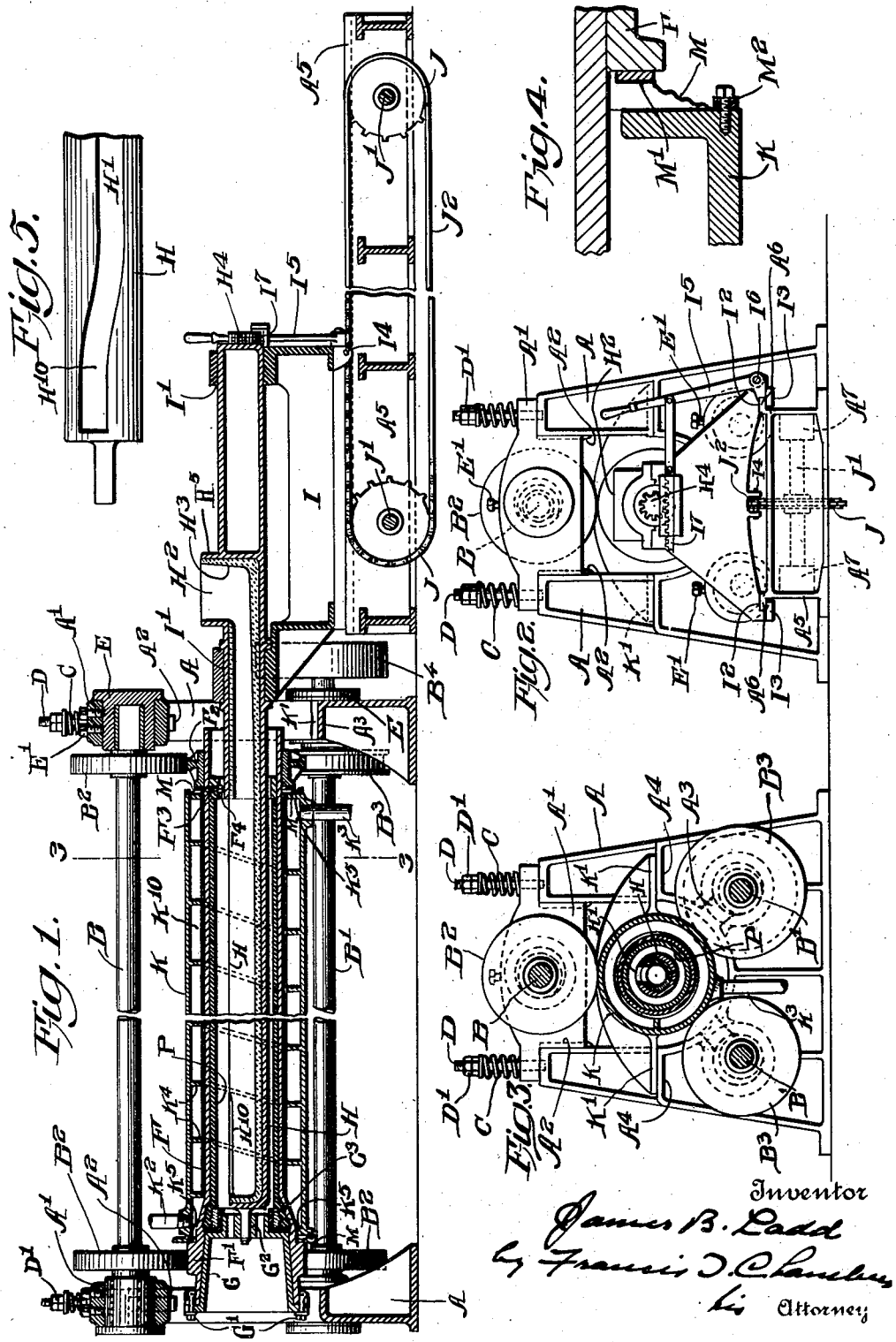

UNITED STATES PATENT OFFICE.

JAMES B. LADD, OF ARDMORE, PENNSYLVANIA, ASSIGNOR TO UNITED STATES CAST IRON PIPE AND FOUNDRY COMPANY, OF BURLINGTON, NEW JERSEY, A CORPORATION OF NEW JERSEY.

CENTRIFUGAL PIPE-CASTING.

1,351,766.   Specification of Letters Patent.   Patented Sept. 7, 1920.

Application filed November 1, 1918. Serial No. 260,656.

*To all whom it may concern:*

Be it known that I, JAMES B. LADD, a citizen of the United States of America, and resident of Ardmore, in the county of Montgomery, in the State of Pennsylvania, have invented certain new and useful Improvements in Centrifugal Pipe-Casting, of which the following is a true and exact description, reference being had to the accompanying drawings, which form a part thereof.

The general object of my invention is to provide an improved centrifugal pipe casting machine especially devised for use in forming relatively large cast iron pipes.

The various features of novelty which characterize my invention are pointed out with particularity in the claims annexed to and forming a part of this specification. For a better understanding of the invention however, and the advantages obtained with its use, reference should be had to the accompanying drawings and descriptive matter in which I have illustrated and described the best form of my invention now known to me.

Of the drawings:

Figure 1 is a sectional elevation of a centrifugal pipe casting machine embodying my present invention.

Fig. 2 is an end elevation of the machine shown in Fig. 1.

Fig. 3 is a section on the line 3—3 of Fig. 1.

Fig. 4 is a section taken similarly to Fig 1, but on a larger scale and showing a portion only of the apparatus of Fig. 1, and Fig. 5 is a plan view of the mold charging trough.

The stationary framework of the centrifugal casting machine shown in the drawings comprises a pair of U shaped pedestals A, which support the ends of the shafts B and B′ carrying the rollers between which the rotating pipe mold F is held. As shown, the shaft B, which is located centrally above the mold, has each end journaled in a corresponding bolster A′, the ends of which extend over the upper ends of the legs of the corresponding U shaped pedestal A. Each of the bolsters A′ is vertically movable along the legs of the corresponding pedestal and is formed with guideways fitting on the tongues $A^2$ formed on the pedestal. The bolsters A′ are yieldingly held against movement away from the position in which their ends rest upon the upper ends of the legs of the pedestal A by springs C interposed between the upper sides of the bolsters and adjustable nuts D′ on bolts D secured at their lower ends to the pedestals A. The roller shafts B′, of which there are two, are located below the axis of the rotating mold and at opposite sides of the vertical plane including that axis. The bearings for the ends of the shafts B and B′ each comprises a bearing member E, the outer surface of which is a cylinder received in a corresponding cylindrical seat way formed in the corresponding pedestal A or bolster A′, and secured in any desired angular adjustment therein as by means of the set screws E′. Each bearing member E is formed with a bearing proper, the axis of which is parallel to, but is eccentrically disposed with respect to the axis of the cylindrical exterior surface of the bearing member. With this arrangement any of the shafts B or B′ may be adjusted toward and away from the axis of rotation of the mold F by the angular adjustment of the corresponding bearing members E in their seat. The bearing, proper, contained in each bearing member E may be of any usual or suitable form. To permit the ready insertion in, and removal from the pedestals A of the shafts B slots $A^3$ are formed in the pedestals. These lead to the concave inner surface of each U shaped pedestal from the seats for the corresponding bearing members E. These slots are of a width to permit an easy lateral movement of the shafts B′ therethrough when the bearing members E are removed. The bearing members E may be moved axially out of their seats when the set screws E′ are loosened.

The mold F which ordinarily will be formed of cast iron is shown as tubular, and of uniform diameter except at one end where it is enlarged to provide for the enlargement of the mold cavity to form the bell end of the cast metal pipe P. Adjacent the bell end, the mold is formed with an integral circumferential rib F′, the periphery of which is engaged by the peripheral surfaces of the rollers $B^2$ carried at corresponding ends of the shafts B and B′. At its opposite end the mold F is surrounded by an annular bearing member $F^2$ which may be shrunk in place on the mold F and is engaged by flanged rolls $B^3$ carried by the corresponding ends of the shafts $B'$, and having flanges engaging the opposite sides of a circumferential rib running around the annular member $F^2$. The periphery of this rib is engaged by the peripheral tread surfaces of the rollers $B^3$, and by the periphery of the corresponding roller $B^2$ carried by the shaft B. $B^4$ is a driving pulley on shaft $B'$.

The bell end of the mold F is closed in operation by a removable cup shaped member G, which extends into the bell end of the mold and is detachably secured therein as by means of clamping bolts $G'$. The other end of the mold is closed by an annular member $F^3$, which is slidingly received in the mold F, and may be secured therein as by set screws $F^4$ in different positions along the length of the mold according to the length of the cast iron pipe P to be formed. When I refer to the members G and $F^3$ as closing the ends of the mold, I mean that they effectually close the ends of the mold against the axial outflow of the molten pipe forming metal in the casting operation, and not that they actually seal the mold cavity ends, which, on the contrary, are freely open to the atmosphere. The inner wall of a short length of the bell end of the pipe is preferably positively defined by a dried sand annular core member $G^3$ carried by the end member G. The mold end member G is formed with a bearing for a trunnion carried by the bell end of the mold charging trough H, which extends longitudinally through the pipe mold and projects out of the latter at the spigot end of the mold. The outer portion of the trough H is connected to a carriage I, movable parallel to the axis of rotation of the mold toward and away from the spigot end of the latter on a guideway or supporting base $A^5$ provided for the purpose. As shown the carriage I has surfaces $I^2$ engaging the upper sides of guide ribs $A^6$, forming a part of the framework $A^5$, and has other guide surfaces $I^3$ engaging the under sides of the ribs $A^6$. The trough H is shown as cylindrical and is formed with a discharge slot $H'$ in its side which is normally uppermost. The slot $H'$ runs longitudinally of the trough H along the portion of the length of the latter which is received in the mold cavity. The trough H is formed at its outer end with an inlet $H^2$ for the molten metal, which is surrounded by an integral funnel like projection $H^5$ from the trough. The opposite side walls of the discharge slot $H'$ are, for the major portion of the length of the slot, parallel to the length of the trough, but the slot is formed with a bend or curve adjacent the bell end of the trough, so that the end portion $H^{10}$ of the slot is angularly in advance of the body of the slot having respect to the direction of rotation of the trough in discharging the molten metal into the mold in the pipe forming operation. The trough H is preferably formed of cast metal and is lined with a suitable refractory lining $H^3$. The trough H is journaled in the carriage I to permit the rotation of the trough about an axis parallel to its length. The rotation of the trough is brought about, as shown, by means of a spur gear $H^4$, secured to the outer end of the trough and in mesh with a transverse rack bar $I^7$ slidingly mounted in the carriage I. A lever $I^5$ is pivoted to the projection $I^6$ and link connected to the rack bar $I^7$, so that when the lever $I^5$ is oscillated the rack $I^7$ is reciprocated in the direction of its length and the trough H thereby rotated.

To move the trough H axially in and out of the mold F I employ a belt $J^2$ running over pulleys J, the shafts $J'$ of which are journaled in bearings $A^7$, carried by the framework $A^5$ near its opposite ends. The belt $J^2$ is connected at one point to the carriage I as by means of the connector $I^4$. When the pulleys J are rotated in one direction or the other by suitable means (not shown), the carriage I is moved lengthwise of the mold into or out of the normal operating position shown in Fig. 1.

To prevent overheating of the mold, I provide means for surrounding the mold by a cooling water jacket. As shown, this jacket comprises a stationary cylindrical shell K, provided with lateral projections $K'$ adapted to rest on supporting shoulders $A^4$ carried by the pedestals A. The cooling water shell K comprises a body portion spliced away from the mold F to provide a suitable water space $K^{10}$ between it and the mold. The shell K has internal end flanges $K^5$ formed with openings somewhat larger in diameter than the external diameter of the corresponding portions of the mold F, so that the latter does not directly contact with the shell K. To prevent leakage out of the shell K at the open joints between it and the mold F, I provide a packing between each end of the shell K and the mold. As shown, each of these packings comprise a dished flexible gasket or spring washer M, advantageously formed out of corrugated steel, which is rigidly secured at its periphery to the corresponding end of the shell K near the periphery of the latter. Secured to each member M at its inner margin is an annular contact member $M'$, formed of brass or other suitable metal, and having one of its radially extending sides in contact with a radial surface of the mold F. As shown, this radial surface at the bell end of the mold, is the inner side of the bearing rib $K'$; and the other end of the mold, the radial surface engaged by the corresponding annular bearing member $M'$ is formed on the annular bearing member F³. K² is the water inlet to the shell K and is preferably located at the bell end of the mold, where on account of the greater amount of metal in the bell end of the pipe the maximum cooling action is required. The cooling water outlet K³ of the shell is located at the opposite end of the mold. Advantageously I provide a continuous spiral deflector rib on the inner wall of the shell K. The inner edge of this rib is in close proximity to, but should not contact with the periphery of the mold F. The effect of this rib is to cause the major portion of the cooling water entering the shell K, through the inlet K², to pass to the outlet K³ through a spiral path comprising a considerable number of convolutions. Advantageously, the water flowing along this spiral path travels about the axis of rotation of the mold in a direction opposite to that in which the mold itself is rotated in the casting operation.

Those skilled in the art will understand that the apparatus disclosed possesses a number of constructional and operating advantages of practical importance. The means for supporting and rotating the mold F permit of a rapid rotation of the mold in the casting operation with an economical expenditure of power for this purpose. The mold is held against axial displacement by the flange rolls B³ without interfering with the expansion and contraction of the mold as its temperature changes. The casting formed may be readily withdrawn from the mold when the end member G is removed without moving the mold itself out of its bearings. When it is desired to remove the mold for replacement by another of different size or shape, or for other purposes this may be easily accomplished by lifting the bolsters A' and the shaft B out of the way, and then lifting the mold with the water jacket K surrounding it up out of the pedestals A. The adjustable bearings for the shafts B and B' permit the accurate alinement with the charging trough H of molds differing somewhat in the diameter of their bearing surfaces engaged by the rollers B² and B³. The means for axially and rotatably adjusting the charging trough H are simple and effective. The angular advancement of the bell end H¹⁰, of the slot H', causes a greater portion of the molten metal per unit of axial length of the mold to be discharged at the bell end of the mold, than along the remainder of the mold when the trough H is rotated by the manipulation of the lever I⁵ to charge the mold. This excess discharge of molten metal at the bell end of the mold provides the necessary metal for filling the portion of the mold cavity beyond the inner end of the core portion G³. This portion of the mold cavity, in the construction illustrated, not only lies beyond the end of the trough H, but takes more molten metal per axial mold length than does the body of the pipe. The excess metal thus poured in at the bell end of the mold, may be regulated by varying the speed with which the trough H is rotated in the mold charging operation, the slower the trough is rotated, the greater the excess of the metal discharged at the bell end of the mold. The provisions made for cooling the mold are simple and effective and adequate to permit successive casting operations to be performed in the same mold at rapidly recurring intervals.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without the corresponding use of other features.

Having now described my invention, what I claim as new and desire to secure by Letters Patent, is:

1. In a centrifugal casting machine, the combination with a rotatable mold, of a stationary cooling water jacket shell surrounding the mold and having an inlet at one end and an outlet at the other end for the cooling water, and formed with a spiral internal rib providing a spiral path of flow between said inlet and outlet.

2. In a centrifugal casting machine, the combination with a rotatable mold, thereof, of a cooling water jacket surrounding the mold and having an inlet at one end and an outlet at the other end and having an internal rib for causing the water to flow from the inlet to the outlet through a spiral path around the mold.

3. In a centrifugal pipe casing machine, the combination with a rotating pipe mold enlarged at one end to form the bell end of the pipe, and a cooling water jacket surrounding the mold and provided with an inlet at the bell end of the mold and an outlet at the opposite end of the mold.

4. In a centrifugal casting machine the combination with a rotatable mold member, of a stationary cooling water jacket shell member surrounding the same, and a packing for the joints between the mold and shell at each end of the latter comprising a resilient annular metal part rigidly secured to one of said members and in sliding contact with the other of said members.

5. In a centrifugal pipe casing machine, the combination with a rotatable mold internally enlarged at one end to form a bell ended pipe, of a charging trough longitudinally disposed in said mold and serving to charge the latter with molten metal when the trough is rotated, said trough having its overflow edge shaped to discharge molten metal in greater quantity at the bell end of the pipe than along the body of the mold when the trough is rotated.

6. In a centrifugal casting machine, the combination with a rotatable mold, of a rotatable mold charging trough longitudinally disposed in the mold and having a portion of its discharge edge in angular advance of the remainder of the edge with respect to the direction of rotation of the trough in the mold charging operation whereby more metal may be discharged at the portion of the mold adjacent the advanced portion of said edge than at other portions of the mold.

7. In a centrifugal casting machine, the combination with a rotatable mold, of a mold charging device in the form of a conduit having one end projecting into the mold cavity, a carriage to which the outer end of the trough is secured, a track upon which said carriage is movable toward and away from the mold, a pair of spaced apart pulleys journaled in a belt running over said pulleys and adjacent the opposite ends of said track connected at one point to said carriage whereby the latter may be moved toward and away from the mold by rotating said pulleys.

8. In a centrifugal casting machine with a rotatable mold, the combination of a charging device in the form of a rotatable trough having one end projecting into the mold cavity, a carriage in which the outer end of the trough is journaled, a track upon which said carriage is movable toward and away from the mold, and means for rotating said trough comprising a spur gear secured to said trough, a rack bar in mesh with said gear and mounted in said carriage to move transversely to the length of said trough and means mounted on said carriage for reciprocating said rack bar.

9. In a centrifugal casting machine, the combination with a revolving mold, of a supporting framework formed with cylindrical seats, the axes of which are parallel to the mold axle, roller mold supports, and bearing members for the latter formed with cylindrical surfaces received in said seats and eccentric with respect to said roller supports whereby the latter may be adjusted toward and away from the mold by the angular adjustment of said bearing members in said seats.

10. In a centrifugal casting machine, the combination with a rotatable mold, of supporting means therefor comprising pedestals having cylindrical seats formed in their base portions and slots leading from each of said seats to an edge of the corresponding pedestal, bearing members axially insertible in, and removable from said seats, roller shafts journaled in said bearing members and movable laterally out of said pedestals through said slots when the corresponding bearing members are removed.

11. In a centrifugal casting machine, the combination with a rotatable mold, of supporting means comprising U shaped pedestals, one at each end of the mold with the latter located between the legs of the pedestals, said pedestals having cylindrical seats formed in their base portions and having slots extending from their inner edges adjacent their base portions to said seats, bearing members axially insertible in and removable from said seats, and mold supporting roller shafts journaled in said bearings, and laterally movable out of said pedestals through said slots when the corresponding bearing members are removed.

JAMES B. LADD.